United States Patent
Park

(10) Patent No.: US 9,124,681 B2
(45) Date of Patent: Sep. 1, 2015

(54) PORTABLE TERMINAL WITH STYLUS PEN

(71) Applicant: Samsung Electronics Co., Ltd, Gyeonggi-do (KR)

(72) Inventor: Sung-Chul Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 165 days.

(21) Appl. No.: 13/907,650

(22) Filed: May 31, 2013

(65) Prior Publication Data

US 2014/0192462 A1 Jul. 10, 2014

(30) Foreign Application Priority Data

Jan. 7, 2013 (KR) .................. 10-2013-0001568

(51) Int. Cl.
*G06F 1/16* (2006.01)
*H04M 1/02* (2006.01)
*H04M 1/21* (2006.01)

(52) U.S. Cl.
CPC .............. *H04M 1/0262* (2013.01); *H04M 1/21* (2013.01)

(58) Field of Classification Search
CPC .................................................. G06F 1/1635
See application file for complete search history.

(56) References Cited

U.S. PATENT DOCUMENTS

| | | | | | |
|---|---|---|---|---|---|
| 4,611,406 | A | * | 9/1986 | Engstrom et al. | 33/443 |
| 5,067,573 | A | * | 11/1991 | Uchida | 345/173 |
| 5,180,891 | A | * | 1/1993 | Trumbo | 178/19.01 |
| 5,506,749 | A | * | 4/1996 | Matsuda | 361/679.58 |
| 5,555,157 | A | * | 9/1996 | Moller et al. | 361/679.3 |
| 5,703,626 | A | * | 12/1997 | Itoh et al. | 345/173 |
| 5,756,941 | A | * | 5/1998 | Snell | 178/19.01 |
| 6,014,552 | A | * | 1/2000 | Aiken et al. | 455/575.1 |
| 6,392,639 | B1 | * | 5/2002 | Lee et al. | 345/179 |
| 6,421,233 | B1 | * | 7/2002 | Hong | 361/679.55 |
| 7,023,430 | B2 | * | 4/2006 | Liu et al. | 345/179 |
| 7,518,598 | B2 | * | 4/2009 | Liu | 345/179 |
| D643,807 | S | * | 8/2011 | Jiang | D13/103 |
| 8,194,055 | B2 | * | 6/2012 | Liu et al. | 345/179 |
| 8,299,933 | B2 | * | 10/2012 | Deng | 340/636.1 |
| 8,325,481 | B2 | * | 12/2012 | Dong et al. | 361/679.55 |
| D673,909 | S | * | 1/2013 | Zaslavsky et al. | D13/110 |
| D680,070 | S | * | 4/2013 | Zaslavsky | D13/110 |
| 8,519,985 | B2 | * | 8/2013 | Feng et al. | 345/179 |
| 2004/0118743 | A1 | * | 6/2004 | Yang et al. | 206/701 |
| 2012/0133619 | A1 | * | 5/2012 | Chen | 345/179 |

* cited by examiner

*Primary Examiner* — Anthony Q Edwards

(57) ABSTRACT

A portable terminal with a stylus pen includes a battery accepting recess formed on a face of the portable terminal, and a guide hole provided at a side of the battery accepting recess. The stylus pen is inserted through the guide hole such that the stylus pen is coupled within the portable terminal in a state where at least a part of the stylus pen is accommodated in the battery accepting recess. The portable terminal allows a stylus pen accommodating space to be used as a space for receiving a battery pack such that a battery pack with an expanded capacity can be coupled therein.

18 Claims, 5 Drawing Sheets

PORTABLE TERMINAL WITH STYLUS PEN

CROSS-REFERENCE TO RELATED APPLICATION(S) AND CLAIM OF PRIORITY

The present application is related to and claims the priority under 35 U.S.C. §119(a) to Korean Application Serial No. 10-2013-0001568, which was filed in the Korean Intellectual Property Office on Jan. 7, 2013, the entire content of which is hereby incorporated by reference.

TECHNICAL FIELD

The present disclosure relates generally to a portable terminal, and more particularly, to a portable terminal with a stylus pen.

BACKGROUND

Typically, a portable terminal means a device that allows a user to use a communication function, such as voice communication or short message transmission, a multimedia function, such as playing of music or a moving picture, and an entertainment function, such as a game while the user is carrying the device. Such portable terminals are fabricated in various types considering the specialized functions and portability of each of them, and can be classified into, for example, a bar-type portable terminal, a flip/folding-type portable terminal, and a sliding-type portable terminal based on the external appearances thereof. As the multimedia function of the portable terminal has been strengthened recently, a large display device tends to be equipped in a portable terminal. In addition, as the degree of integration is increased and massive and ultrahigh speed wireless communication is popularized, various functions are integrated in a single portable terminal, for example, a mobile communication terminal.

Upon considering the portability of a portable terminal, miniaturization and weight lightening have been required. However, as a display device in such a portable terminal is becoming bigger in size, the effort has focused on reducing the thickness of the portable terminal rather than miniaturization and weight lightening. In addition, a battery capacity for such a portable terminal is proportional to the volume of a battery pack. The battery capacity can be increased in proportion to the increase of the size of the display device. However, as the thickness of the portable terminal is reduced in consideration of the portability as described above, there is a limit in substantially increasing the battery capacity. Further, as the performance of such a display device is strengthened to be capable of implementing high-definition as well as becoming larger in size, the power consumed by the display device is considerable. In addition, when a touch screen function is incorporated in the display device, the power consumed by the display device will be further increased. Consequently, as the power consumed by the display device is further increased as compared to the increase of the battery capacity, users are not content with the battery performance or capacity.

Meanwhile, a portable terminal can be provided with a stylus pen such that the touch screen of the portable terminal can be operated in greater detail. The stylus pen can be separately carried by a user but can be configured to be accommodated within the portable terminal itself so that the stylus pen can be easily and conveniently carried. When the stylus pen is stored within the portable terminal, the space for accommodating the stylus pen cannot be practically used in, for example, arranging a circuit. Accordingly, a portable terminal configured to accommodate a stylus pen becomes poor in the efficient use of internal space, for example, in cases such as arranging a circuit.

SUMMARY

To address the above-discussed deficiencies, embodiments of the present disclosure provide a portable terminal that allows an internal space thereof to be efficiently used while providing a stylus pen accommodating space.

Certain embodiments of the present disclosure include a portable terminal having a stylus pen which may be easily and conveniently carried even when the stylus pen is not accommodated in the portable terminal.

Certain embodiments of the present disclosure include a portable terminal that is configured to be capable of accommodating a stylus pen and to commonly use a stylus pen accommodating for mounting a battery such that a battery pack with an expanded capacity can be coupled to the portable terminal as desired.

Certain embodiments of the present disclosure include a portable terminal with a stylus pen. The portable terminal includes a battery accepting recess formed on a face of the portable terminal, and a guide hole provided at a side of the battery accepting recess. The stylus pen is inserted through the guide hole such that the stylus pen is mounted in the portable terminal in a state where at least a portion of the stylus pen is accommodated in the battery accepting recess.

The portable terminal further include a first battery pack mounted to occupy the entirety of the space provided by the battery accepting recess, and a second battery pack mounted to occupy a portion of the space provided by the battery accepting recess. One of the first and second battery packs is mounted in the battery accepting recess, and in the state where the stylus pen is stored in the portable terminal, the second battery pack is mounted in the battery accepting recess.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system. Hereinafter, various embodiments of the present disclosure will be described with reference to the accompanying drawings. In the following description of the present disclosure, a detailed description of known functions for configurations incorporated herein will be omitted when it may make the subject matter of the present disclosure rather unclear.

Figure 1:
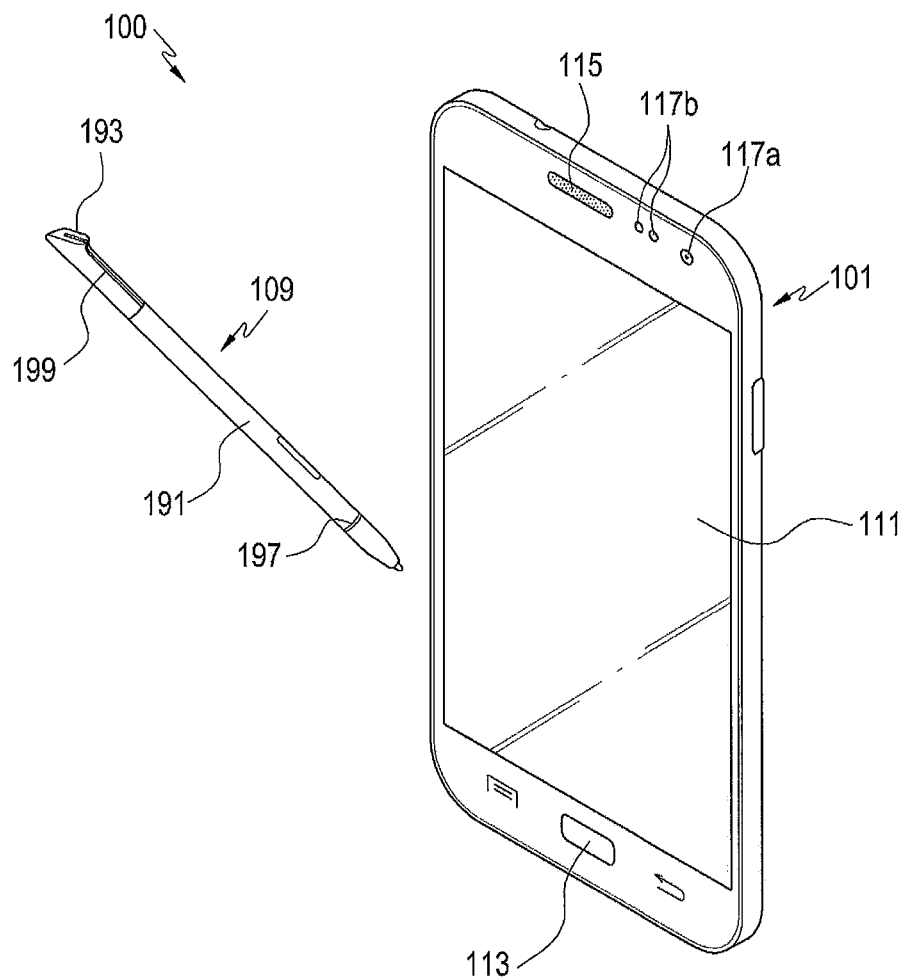
FIG. 1 illustrates a perspective view of a portable terminal according to embodiments of the present disclosure.

As illustrated in FIG. 1, the portable terminal 100 is configured to be capable of accommodating a stylus pen 109, which is stored in the portable terminal 100 in a state where the stylus pen 100 occupies a portion of a battery accepting recess 121 (see FIG. 5) provided in the portable terminal 100. Although the portable terminal 100 is shown in FIG. 1. as a bar-type portable terminal with a single housing 101, other types of portable terminals, for example, a flip/folder-type portable terminal and a sliding-type portable terminal, may be configured so as to store the stylus pen 109 using a portion of a space for the battery accepting recess 121.

On the front face of the housing 101, a display device 111 is installed, in which a keypad area including a home key 113 may be arranged at one side of the display device 111 in the front face of the housing 101, for example, at the lower side, and a receiver unit 115 may be arranged at the other side. At one side of the receiver unit 115, for example, a front camera 117a, and an ambient light sensor 117b, can be arranged.

A battery pack is mounted on the rear face of the housing 101, and a separate cover member 101c is provided to protect the battery pack mounted on the housing 101. The more specific construction of the portable terminal 100 will be described in more detail below with reference to FIG. 4.

Figure 2:
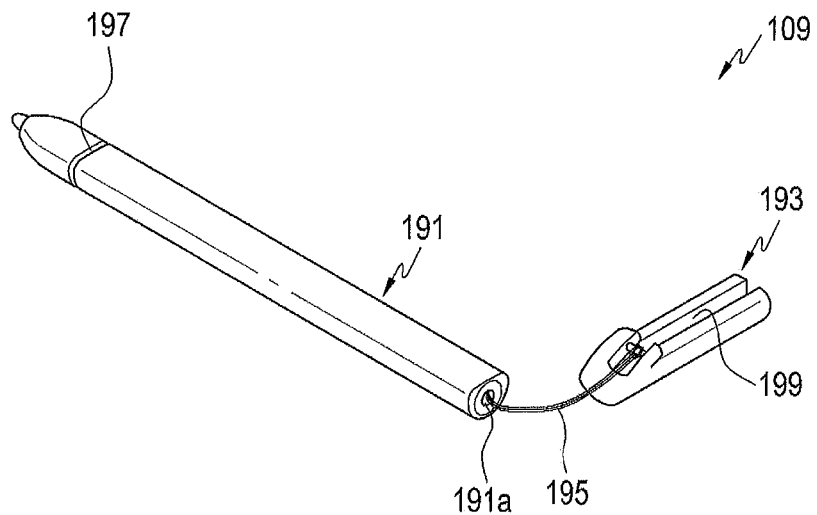
FIG. 2 illustrates a perspective view of the stylus pen of the portable terminal illustrated in FIG. 1.
Figure 3:
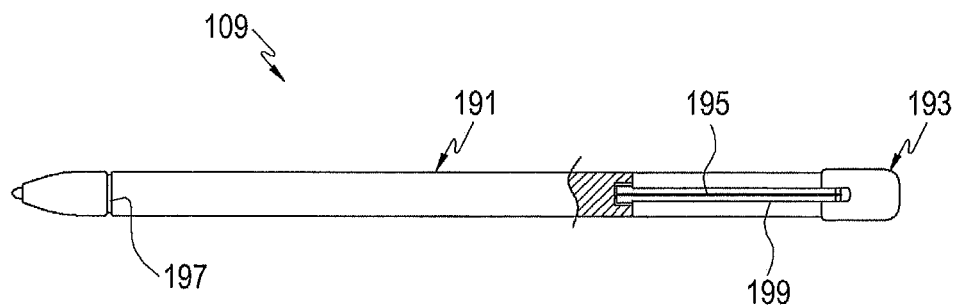
FIG. 3 illustrates a plan view of the stylus pen illustrated in FIG. 2.

Further, referring to FIGS. 2 and 3, the stylus pen 109 includes a body 191, a holder 193 configured to be removable from the body 191, and a strap 195 configured to connect the holder 193 to the body 191. The stylus pen 109 is inserted into the housing 101 of the portable terminal 100 in the longitudinal direction, thereby being accommodated in the inside of the housing 101. In addition, only the holder 193 is stored in the housing 101 of the portable terminal 100 in the state where the holder 193 is separated from the body 191. In such a case, the holder 193 will not occupy the battery accepting recess of the portable terminal 100. In the state where the stylus pen 109 is accommodated in the housing 101, a battery pack with a standard capacity can be mounted in the battery accepting recess 121. In the state where the stylus pen 109 is separated from the housing 101 or only the holder 193 is stored in the housing 101, a battery pack with a capacity expanded as compared to the battery pack of the standard capacity can be placed in the housing 101.

One end of the body 191 is configured as a tip to be contacted with the display device 111 in which the touch screen function is incorporated, and a locking recess 197 is formed around the one end of the body 191. The locking recess 197 is configured to be engaged with a locking member 129 (see FIG. 4) provided in the inside of the portable terminal 100 to hold the stylus pen 109 in such a manner that stylus pen 109 does not break away from the state where the stylus pen 109 is accommodated within the portable terminal 100. Although the locking recess 197 is shown in FIGS. 2 and 3 as being formed on the outer circumferential surface of the body 191, the locking recess 197 can be formed on the outer circumferential surface of the holder 193.

As described above, the holder 193 is removably provided at the other end of the body 191. The other end of the body 191 is formed with a hole 191a, into which a part of the holder 193 may be fixedly inserted. In the state of being coupled to the body 191, the holder 193 is arranged to form a straight line with the body 101. One end of the strap 195 is connected to the other end of the body 191, and the other end of the strap 195 is connected to the one end of the holder 193, thereby connecting the holder 193 to the body 191. A strap slot 199 is formed on the outer circumference of the holder 193. The strap slot 199 is formed to extend in the longitudinal direction from the one end to the other end of the holder 193, and accommodates the strap 195. As illustrated in FIG. 2, in the state where the holder 193 is separated from the body 191, the body 191 and the holder 193 are freely movable in relation to each other in the range of the length of the strap 195. Accordingly, when the holder 193 is disposed within the housing 101 in the state where the holder 193 is separated from the body 191, the body 191 can be used as an accessory of the portable terminal 100.

In addition, although not illustrated, the other end of the body 191, i.e., the portion connected to the strap 195 is configured to be separable from the other portion of body 191, the body 191 can also be separated into two parts in the state where only the holder 193 is disposed within the housing 101. A user who does not use the stylus pen so frequently may separate the body 191 into two parts, and store or carry the part not connected to the strap 195 by completely separating the part from the housing of the portable terminal 100. Further, an ornamental effect using the holder 193 and the strap 195 can be maximized by providing an accessory which can be tied to the part of the body 191 connected to the strap 195.

FIG. 3 illustrates the holder 193 coupled and fixed to the body 191. When the holder 193 is coupled to the body 191, a part of the other end of the holder 193 is inserted into the body 191. In that event, the strap 195 is disposed within the strap slot 199 and does not substantially protrude to the outside of the stylus pen 109. Meanwhile, when the strap 195 is fabricated using an elastic material, an elastic force can be provided in a direction to keep the holder 193 closely coupled to the body 191. That is, as illustrated in FIG. 3, the strap 104 can be configured such that a tension is applied to the strap 195 in the state where the other end of holder 193 is coupled to the other end of the body 191. In that event, the strap 195 will provide an elastic force in the direction to make the holder 193 come into close contact with the body 191. In addition, since the tension is applied to the strap 195 in the state where the other end of the holder 193 is coupled to the other end of the body 191, the strap 195 can be stably retained in the state where it is accommodated in the strap slot 199.

Figure 4:
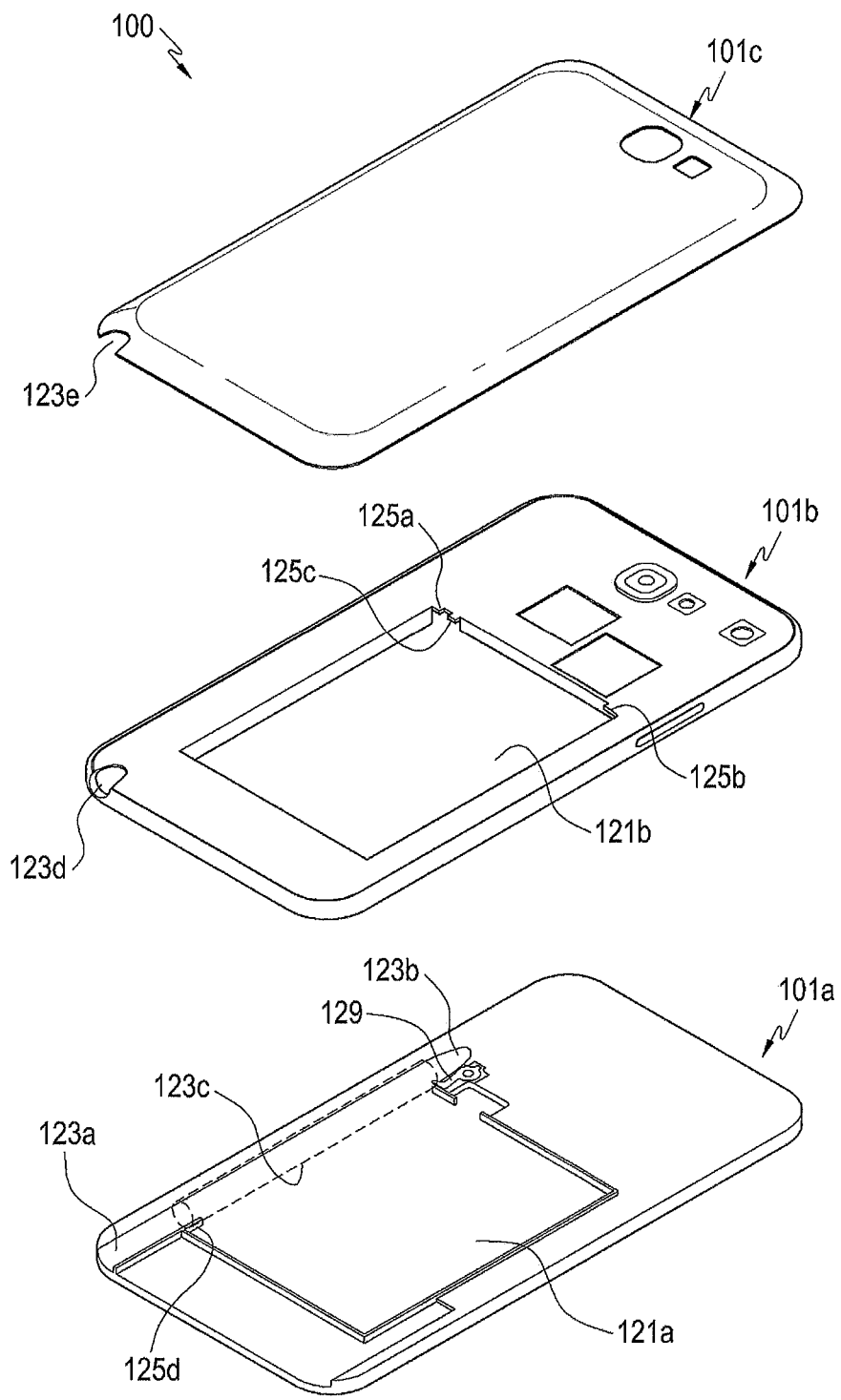
FIG. 4 illustrates an exploded perspective view of the portable terminal illustrated in FIG. 1.
Figure 5:
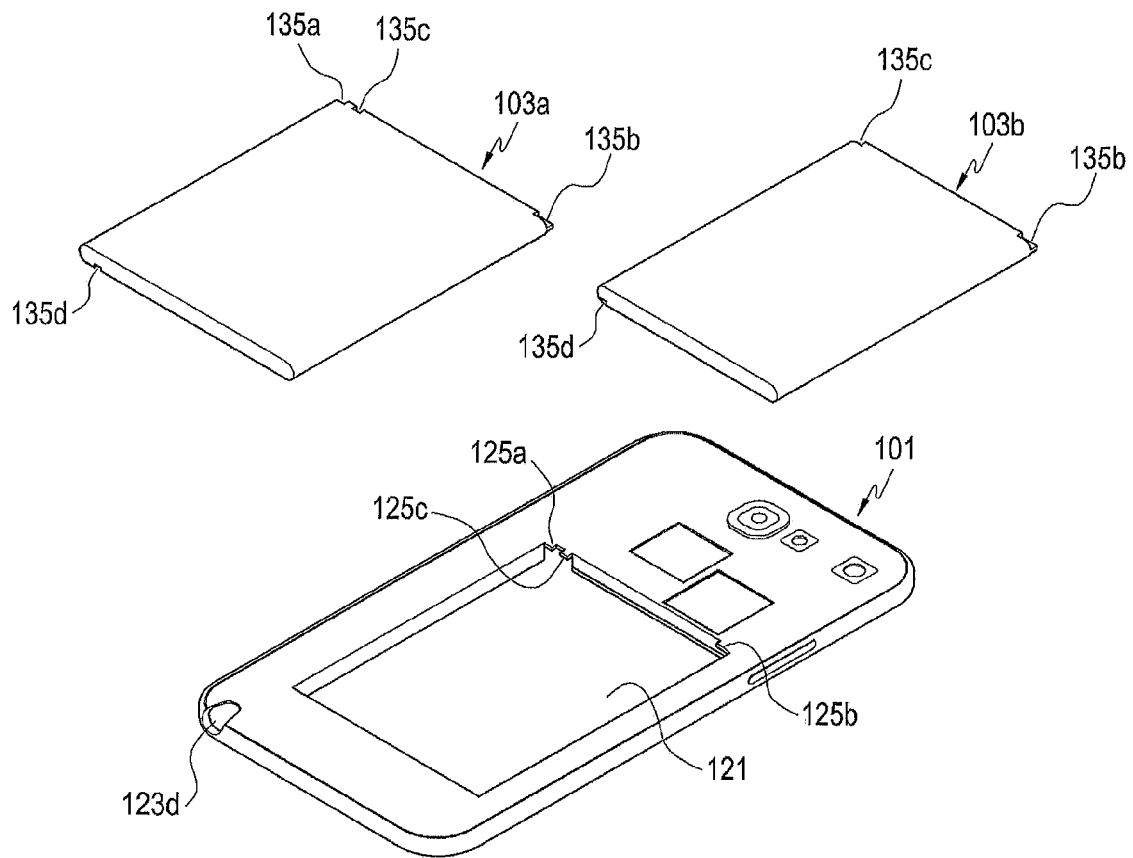
FIG. 5 illustrates a perspective view for describing an example of mounting a battery pack of the portable illustrated in FIG. 1.
Figure 6:
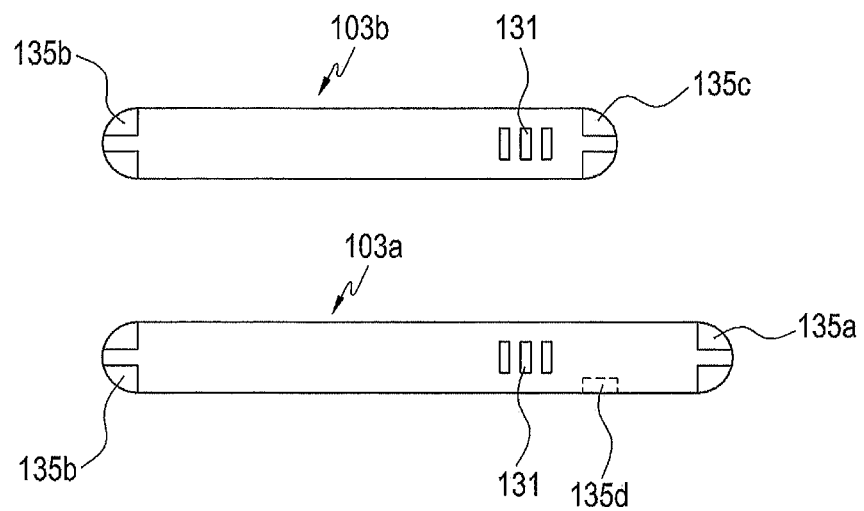
FIG. 6 illustrates top views of the battery packs illustrated in FIG. 5.

Referring to FIG. 4, the housing 101 is completed by assembling the front case 101a and the rear case 101b, and the cover member 101c is removably attached to the rear surface of the housing 101. The display device 111 is arranged on the front face of the front case 101a, and the rear face of the front case 101a is enclosed by the rear case 101b, thereby forming a space in which, for example, a circuit board can be arranged. In addition, a battery mounting surface 121a is on the rear face of the front case 101a, and the rear case 101.b is formed with an opening 121b corresponding to the battery mounting surface 121a. The opening 121b includes side walls positioned around the battery mounting surface 121a. As illustrated in FIG. 5, when the front case 101a and the rear case 101b are assembled to each other, the battery mounting surface 121a and the opening 121b are engaged with each other, thereby forming the battery accepting recess 121. At this time, the side walls provided in the opening 121b practically form the side walls of the battery accepting recess 121.

The battery accepting recess 121 includes with one or more fastening lugs 125a, 125b, 125c, and 125d. In certain embodiments, three fastening lugs 125a, 125b and 125c are at the top side walls of the battery accepting recess 121, and one fastening lug 125d is on the bottom of the battery accepting recess 121. In order to support and fix a battery pack of an approximately standard capacity, the portable terminal includes with at least one, preferably a pair of fastening lugs. In FIGS. 4 and 5, the fastening lug 125b provided at one side corner of the battery accepting recess 121, and the fastening lug 125c at the other side corner are used to support and fix the battery pack of the standard capacity. In addition, another fastening lug 125a is at the other side corner of the battery accepting recess 121 to support and fix a battery pack with an expanded capacity that is mounted in the battery accepting recess 121. For the conciseness of description, the fastening lug 125a that supports and fixes only the battery pack of the expanded capacity is referred to as a "first fastening lug", and the fastening lugs 125b and 125c configured to support and fix both of the battery pack of the expanded capacity and the battery pack of the standard capacity are referred to as a "second fastening lug" and a "third fastening lug", respectively. The second and third fastening lugs 125b and 125c support the battery pack of the expanded capacity while supporting and fixing the battery pack of the standard capacity.

As described above, the portable terminal 100 can further include a fourth fastening lug 125d provided on the bottom of the battery accepting recess 121, i.e., on the battery mounting surface 125d. Like the third fastening lug 125c, the fourth fastening lug 125d is positioned to support the battery pack of the standard capacity, and hence supports the battery pack of the expanded capacity.

The battery pack includes with fastening recesses 135a, 135b, 135c, and 135d which correspond to the fastening lugs 125a, 125b, 125c, and 125d, respectively. In each of FIGS. 5 and 6, a battery pack 103a with an expanded capacity (hereinbelow, referred to as a "first battery pack") and a battery pack 103b with a standard capacity (hereinbelow, referred to as a "second battery pack") are illustrated. One of the first and second battery packs 103a and 103b is in the housing 100 to provide the power of the portable terminal 100. The first battery pack 103a includes the fastening recesses 135a, 135b, 135c, and 135d corresponding to the first to fourth fastening lugs 125a, 125b, 125c, and 125d, respectively, and the second battery pack 103b includes fastening recesses 135b, 135c, and 135d corresponding to the second to fourth fastening lugs 125b, 125c, and 125d, respectively. When the first battery pack 103a or the second battery pack 103b is coupled within the portable terminal 100, the fastening lugs 125a, 125b, 125c, and 125d and the fastening recesses 135a, 135b, 135c, and 135d are engaged with each other, thereby stably fixing and supporting the first battery pack 103a or the second battery pack 103b. As a result, the power output stubs 131 of the first battery pack 103a or the second battery pack 103b are stably connected with the power terminals (not illustrated) provided in the battery accepting recess 121.

Figure 7:
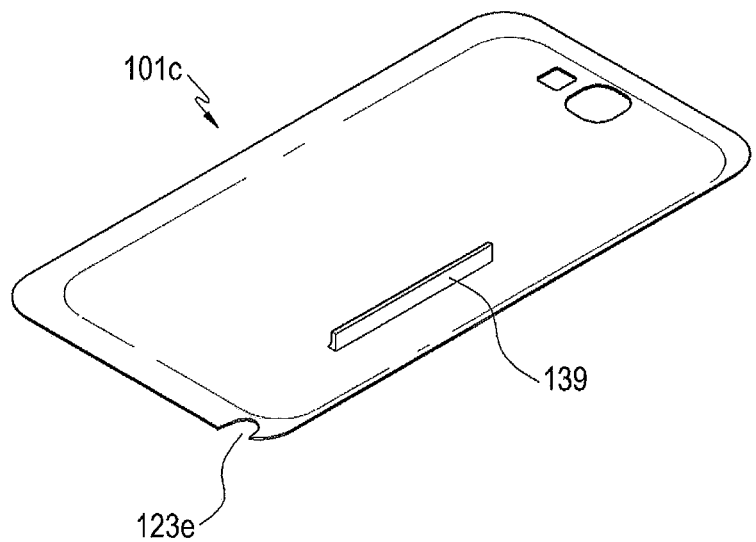
FIG. 7 illustrates a perspective view of the cover member of the portable terminal illustrated in FIG. 4.

Meanwhile, in order to support the second battery pack 103b more stably in the state the second battery pack 103b is coupled within, the cover member 101c is formed with a support piece 139 as illustrated in FIG. 7. The cover member 101c is assembled to the rear side of the housing 101 to conceal and protect the battery accepting recess 121. When the cover member 101c is attached to the housing 101, the support piece 139 is positioned inside of the battery accepting recess 121. Accordingly, in the state where the first battery pack 103a is coupled within, another cover member which is not formed with the support piece 139 should be coupled to the housing 101. That is, the portable terminal 100 can include cover members which correspond to the first and second battery packs 103a and 103b, respectively. However, as described above, since the battery packs are supported and fixed by the fastening lugs 125a, 125b, 125c, and 125d and the fastening recesses 135a, 135b, 135c, and 135d, the support piece 139 is not necessarily provided on the cover member 101c. When the cover member formed with the support piece 139 is coupled to the housing 101 in the state where the battery pack with the standard capacity, i.e., the second battery pack 103b is mounted in the battery accepting recess 121, the support piece 139 is positioned to wrap a side of the second battery pack 103b, thereby supporting and fixing the second battery pack 103b more stably.

The housing 101 is formed with a guide hole 123a and a fixing hole 123b to accommodate the stylus pen 109. The guide hole 123a is positioned at a side of the battery accepting recess 121 and is opened to one side edge of the housing 101. In order to form the guide hole 123a to be opened to the one side edge of the housing 101, the rear case 101b is formed with an opening 123d, and the front case 101a can be a notch 123e. The opening 123d and the notch 123e can be formed at different positions depending on the shapes of the front case and rear case 101a and 101b, respectively. For example, in certain embodiments, the rear case 101b is configured to wrap the front case 101a, and the rear case 101b is formed with the opening 123d to open the guide hole 123a. However, the housing of the portable terminal can be configured such that the front case wraps the rear case, in which case the front case is formed with an opening to open the guide hole.

The fixing hole 123b is positioned at the other side of the battery accepting recess 121 and arranged on a straight line with the guide hole 123a. The locking member 129 is disposed at one side of the fixing hole 123b, in which the locking member 129 is in a shape of a hook, an end of which protrudes into the inside of the fixing hole 123b. In the process of inserting the stylus pen 109, the locking member 129 interferes with the stylus pen 109 and becomes temporarily deformed, and thus retreats from the fixing hole 123b. When the stylus pen 109 is completely inserted, the outer circumferential surface of the stylus pen 109 is compressed. At this time, the locking recess 197 formed on the outer circumferential surface of the stylus pen 109 is engaged with the locking member 129, thereby maintaining the stylus pen 109 in the state where the stylus pen 109 is inserted into and coupled within the portable terminal 100.

Meanwhile, in the state where the stylus pen 109 is inserted into and mounted in the portable terminal 100, the stylus pen 109 will occupy a partial space 123c (hereinafter, to be referred to as a "commonly used space") of the battery accepting recess 121. Accordingly, when it is desired to accommodate the stylus pen 109 in the portable terminal 100, it will be necessary to mount the second battery pack 103b in the battery accepting recess 121. When the first battery pack 103a is mounted in the battery accepting recess 121, the commonly used space 123c will be occupied by the first battery pack 103a. Accordingly, it becomes impossible to accommodate the stylus pen 109 in the portable terminal 100. In that event, the holder 193 is separated from the body 191 of the stylus pen 109, and only the holder 193 is inserted into and fixed in the portable terminal 100, more specifically, in the guide hole 123a. As described above, the holder 193 is accommodated in the guide hole 123a without occupying the battery accepting recess 121. When only the holder 193 is stored in the housing 101, the strap 195 breaks out from the strap slot 199, and the body 191 becomes freely movable in relation to the holder 193 within the range of the length of the strap 195.

As described above, a user may use a stylus pen accommodating space in a portable terminal with a stylus pen as a battery accepting recess, as desired. Therefore, the battery capacity can be increased.

Typically, in a portable terminal using a battery pack with a standard capacity of 1850 mAh, at least a space with a volume of 0.56 cm*0.6 cm*10 cm in the stylus pen accommodating space can be commonly used as a space for inserting the battery pack. The battery pack with the standard capacity has a battery capacity of about 107 mAh per unit volume. Accordingly, when the inventive portable terminal uses the battery pack with the standard capacity of 1850 mAh, a battery pack, the capacity of which is expanded by about 360 mAh, can be coupled within by using the stylus pen accommodating space as the battery pack accepting recess.

In addition, in a portable terminal using the battery pack with a standard capacity of 3100 mAh, at least a space with a volume of 0.59 cm*0.75 cm*7.5 cm in the stylus pen accommodating space can be commonly used as a space for coupling the battery pack. The battery pack with the standard capacity has a battery capacity of about 123 mAh per unit volume. Accordingly, when the inventive portable terminal uses the battery pack with the standard capacity of 3100 mAh, a battery pack, the capacity of which is expanded by about 408 mAh, can be mounted by using the stylus pen accommodating space as the battery pack accepting space.

By configuring a portable terminal 100 to be capable of accommodating a stylus pen 109 and to use a part of the stylus pen accommodating space as a space for coupling a battery pack therewithin as desired as described above, a battery pack with an expanded capacity can be provided. In addition, even when a battery pack with an expanded capacity is coupled within, the stylus pen 109 may be easily and conveniently carried by tying the stylus pen to the housing 101 of the portable terminal 100.

The portable terminal 100 configured as described above uses a stylus pen accommodating space as a space for receiving a battery pack, thereby allowing the user to insert a battery pack with an expanded capacity as desired. That is, when a battery pack with a standard capacity is installed, the stylus pen can be stored within the portable terminal, and as desired by the user, a battery pack with an expanded battery pack can be coupled within the portable terminal 100 in the state where the stylus pen 109 is separated. In addition, since the holder separable from the body is connected by a strap to configure the stylus pen such that the holder 193 can be mounted and fixed in the portable terminal 100, there is an advantage in that the stylus pen 109 may be carried by connecting the stylus pen to the portable terminal even in the state where a battery pack with an expanded capacity is coupled within the portable terminal 100. Consequently, the stylus pen may be easily and conveniently carried, and the stylus pen accommodating space can be used as a space for mounting a battery pack with an expanded capacity as desired.

Although the present disclosure has been described with examples, various changes and modifications may be suggested to one skilled in the art. It is intended that the present disclosure encompass such changes and modifications as fall within the scope of the appended claims.

What is claimed is:

1. A portable terminal configured to store a stylus pen, comprising:
   a battery accepting recess formed on a face of the portable terminal; and
   a guide hole disposed at a side of the battery accepting recess,
   wherein the guide hole is adapted to have the stylus pen inserted such that the stylus pen is coupled within the portable terminal when at least a portion of the stylus pen is stored in the battery accepting recess,
   wherein the battery accepting recess is adapted to separately accept one of (i) a first battery pack configured to occupy an entirety of a space provided by the battery accepting recess, and (ii) a second battery pack configured to occupy a portion of the space provided by the battery accepting recess, and
   wherein, when the stylus pen is coupled within the portable terminal, the second battery pack is used; and
   one or more fastening lugs formed on the battery accepting recess, wherein one of the first and second battery packs coupled within the battery accepting recess is supported by the one or more fastening lugs.

2. The portable terminal of claim 1, further comprising:
   a fixing hole provided at a side of the battery accepting recess,
   wherein one end of the stylus pen is configured to be inserted and fixed in the fixing hole when the stylus pen is coupled within the portable terminal.

3. The portable terminal of claim 2, further comprising:
   a locking member provided adjacent to the fixing hole in the inside of the portable terminal,
   wherein, when the one end of the stylus pen is configured to be inserted in the fixing hole, the locking member fixes the stylus pen.

4. The portable terminal of claim 3, further comprising:
   a locking recess formed on the outer circumferential surface of the stylus pen,
   wherein, when the one end of the stylus pen is accommodated in the fixing hole, the locking member is engaged with the locking recess, thereby fixing the stylus pen.

5. The portable terminal of claim 1, wherein the stylus pen comprises:
   a body that can be at least partially positioned in the battery accepting recess when the body is mounted in the portable terminal;
   a holder that can be removably coupled to one end of the body, and disposed within and fixed in the guide hole; and
   a strap configured to connect the body and the holder.

6. The portable terminal of claim 5, wherein the holder is closely contacted with and fixed to the one end of the body when a part of the holder is inserted into the body.

7. The portable terminal of claim 5, wherein one end of the strap is connected to the one end of the body, the other end of the strap is connected to one end of the holder, the holder is positioned to form a straight line with the body when the other end of the holder is opposed to the one end of the body, and the strap provides an elastic force in a direction to make the other end of the holder come into close contact with the one end of the body.

8. The portable terminal of claim 7, further comprising:
a strap slot formed on the outer circumferential surface of the holder,
wherein the strap is disposed within the strap slot when the holder is positioned to form the straight line with the body.

9. The portable terminal of claim 1, wherein the first battery pack comprises an expanded capacity battery pack.

10. The portable terminal of claim 1, wherein the second battery pack comprises a standard capacity battery pack.

11. The portable terminal of claim 1, wherein the fastening lugs are formed on the bottom surface and the top side wall of the battery accepting recess, respectively.

12. The portable terminal of claim 1, the fastening lugs include a first fastening lug formed at one side corner of the battery accepting recess on the top side wall of the battery accepting recess, and the first battery pack includes a fastening recess corresponding to the first fastening lug.

13. The portable terminal of claim 1, wherein the fastening lugs include a second fastening lug formed on the top side wall of the battery accepting recess, and each of the first and second battery packs includes a fastening recess corresponding to the second fastening lug.

14. The portable terminal of claim 1, further comprising:
a cover coupled to a rear of the housing and configured to conceal and protect the battery accepting recess;
the first battery pack configured to occupy the entirety of the space provided by the battery accepting recess; and
the second battery pack configured to occupy a portion of the space provided by the battery accepting recess.

15. The portable terminal of claim 14, wherein the cover is formed with a support piece configured to correspond to the second battery pack, and wherein when the cover is coupled to the housing, the support piece is positioned inside battery accepting recess.

16. The portable terminal of claim 15, wherein the support piece is configured to be disposed at a side of the second battery pack.

17. The portable terminal of claim 14, wherein the cover is configured to correspond to the first battery pack.

18. The portable terminal of claim 1, further configured to receive within and couple to a stylus pen holder.

* * * * *